Feb. 9, 1937. J. ERWOOD 2,070,226
SOUND AND PROJECTION APPARATUS
Filed June 24, 1935   3 Sheets-Sheet 1
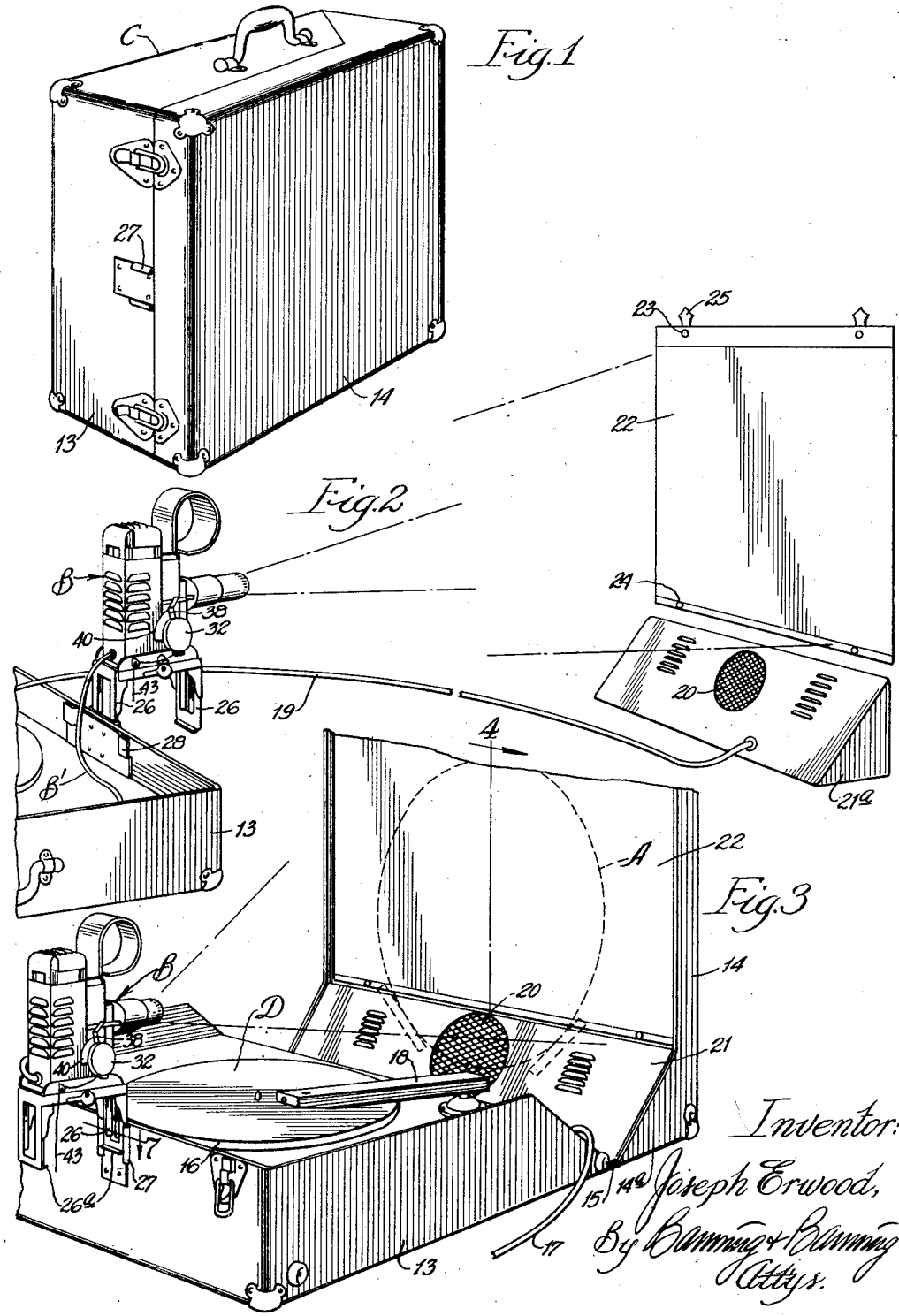
Inventor:
Joseph Erwood,
By Banning & Banning
Attys.

Feb. 9, 1937. J. ERWOOD 2,070,226
SOUND AND PROJECTION APPARATUS
Filed June 24, 1935 3 Sheets-Sheet 2
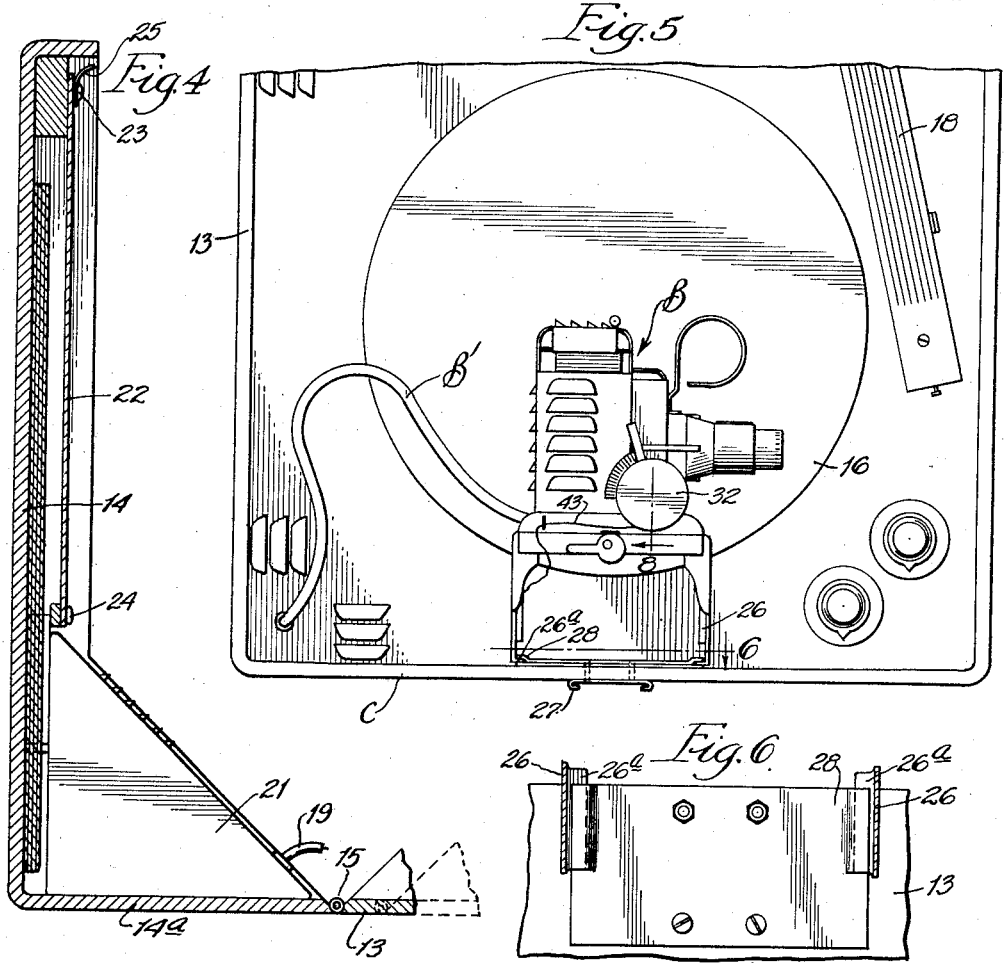
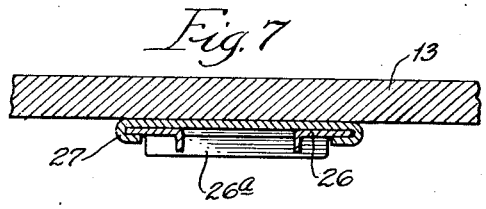
Inventor:
Joseph Erwood,
By Banning & Banning
Attys.

Feb. 9, 1937.  J. ERWOOD  2,070,226
SOUND AND PROJECTION APPARATUS
Filed June 24, 1935   3 Sheets-Sheet 3
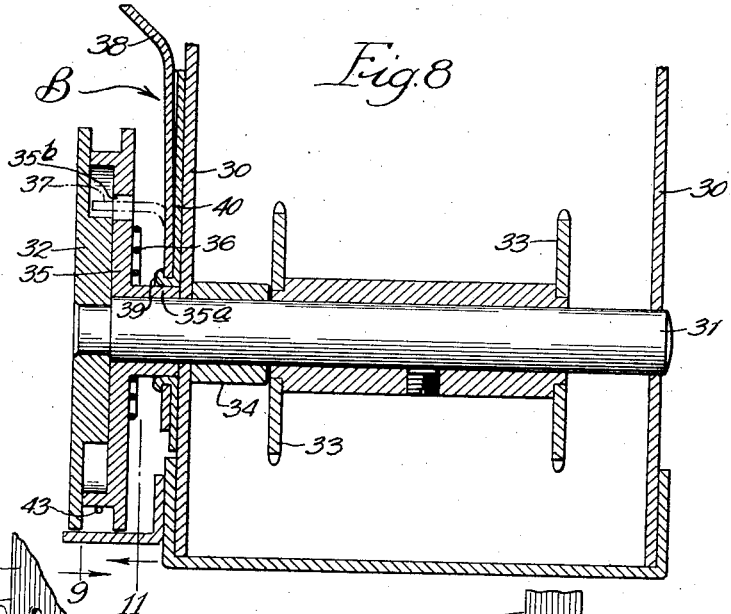
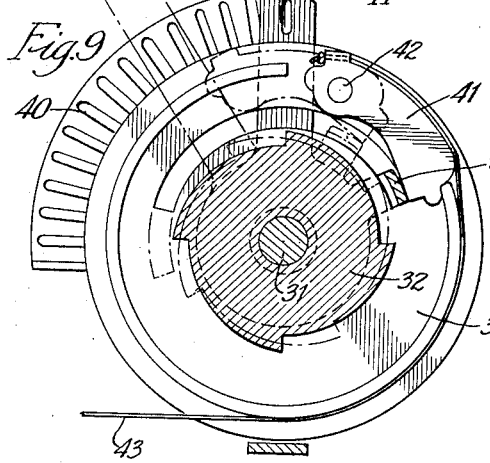
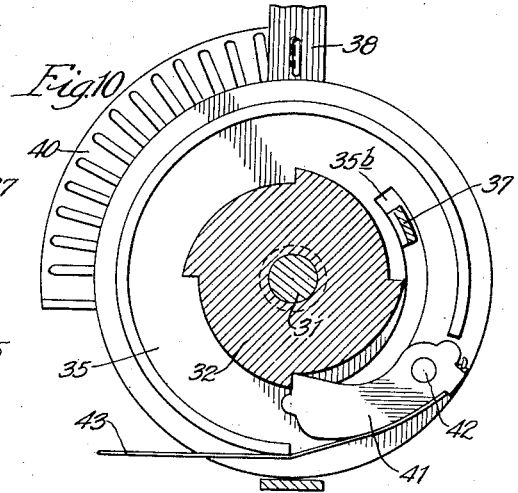
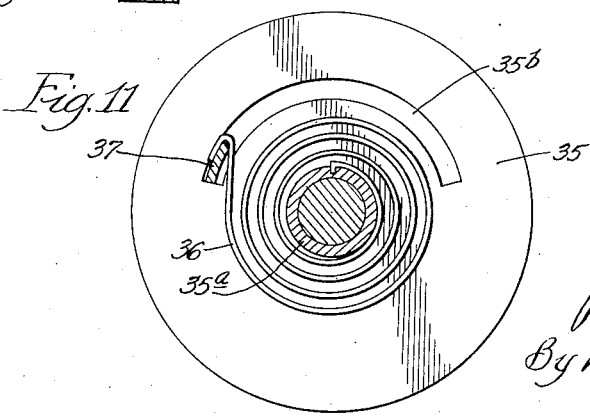
Inventor:
Joseph Erwood
By Banning & Banning
Attys.

Patented Feb. 9, 1937

2,070,226

UNITED STATES PATENT OFFICE 2,070,226

SOUND AND PROJECTION APPARATUS

Joseph Erwood, Chicago, Ill., assignor to The Webster Company, Chicago, Ill., a corporation of Illinois Application June 24, 1935, Serial No. 28,047

2 Claims. (Cl. 88—16.2)

This invention relates to a combined sound and projection apparatus all contained within a single portable cabinet.

It is a primary object of my invention to so combine and arrange the several units as to require for their accommodation a small size cabinet which is easily portable; to combine with such cabinet a hinged cover so formed as to swing away from one cabinet end a distance substantially equal to its transverse dimension; to provide in the cover a screen upon which images may be projected; to provide a mounting for a projector which, in use, will occupy a position of maximum distance from the screen within the cabinet cover; to provide a mounting for the projector which will permit the projector to be reversed in position for the throwing of images in opposite directions; to provide for a detachable mounting of the screen within the cabinet cover, or of the cover and its associated screen, permitting the screen to be removed to a remote position where images may be thrown upon it; to provide for the projector an improved ratchet feed for a film slide operable from a remote point; to provide for the projector a framing device which is simple and effective; to provide in the cabinet cover a loud speaker detachably mounted therein in a non-interfering position relative to the screen; and to provide for the loud speaker a detachable mounting together with a flexible connection to amplifier equipment such that the speaker may, upon occasion, be removed to a distant point for operation in proximity to a screen placed at such point.

These and other objects of my invention are realized by a construction whereof a suggestive embodiment is illustrated in the accompanying drawings in the manner following:

Figure 1 is a view in perspective of the portable cabinet closed up;

Fig. 2 is a perspective view of one corner of the cabinet showing the projector mounted in operating position together with a screen and speaker in a distant location;

Fig. 3 is a perspective view of the cabinet opened up with the projector so mounted as to throw images on the screen here shown as carried on the inside of the cabinet cover;

Fig. 4 is a transverse section through the cabinet cover on line 4 of Fig. 3;

Fig. 5 is a view in plan of the cabinet opened up, showing the projector therein mounted to lie in proximity to the turntable;

Fig. 6 is a detail in section on line 6 of Fig. 5;

Fig. 7 is a detail on line 7 of Fig. 3;

Fig. 8 is an enlarged view in longitudinal section through the film slide spool and ratchet feed therefor, taken on line 8 of Fig. 9;

Fig. 9 is a transverse section taken on line 9 of Fig. 8;

Fig. 10 is a view in elevation of certain of the parts forming the ratchet feed for the film slide; and Fig. 11 is a transverse section on line 11 of Fig. 8.

The embodiment illustrated comprises a portable sound and projection apparatus contained within a cabinet C which in Figure 1 is shown as closed ready for carrying. To the cabinet body 13 is hinged a cover 14 with the aid of a pin 15. The sides of the cover have inclined portions running from the hinge point inwardly and upwardly as viewed in Fig. 3 to stiffen the cover and to provide an enclosure for apparatus to be housed therein, as will later be described. Each inclined portion forms an obtuse angle with a straight side portion of the cover, and the corresponding side portion of the cabinet is made complementary therewith so that when the cover is closed the two complementary portions meet throughout in edgewise relation.

The cabinet body houses an electric sound reproducing and amplifying apparatus including a turntable 16 driven by an electric motor (not shown) adapted to be connected to a lighting socket through a flexible connection 17 (Fig. 3) which is contained within the cabinet when the latter is closed. The turntable is adapted to support a sound record disk D, and a sound reproducer pick-up arm 18, pivotally mounted at one end, carries an electric reproducer having a needle adapted to track in the grooves of the sound record.

The electric impulses produced by the pickup are amplified in suitable apparatus (not shown) in the cabinet body, and these amplified impulses are transmitted through suitable electric leads 19 (Fig. 2) to a loud speaker of any suitable type (not shown) which lies behind an opening 20 in a wall 21 located in the cover and which is preferably inclined to the vertical. Within the cover 14 may also be carried an image projection screen 22 preferably secured at the top and bottom, as by separable fasteners 23, 24, respectively, so that by pulling upon tabs 25 the screen can be removed from the cover and placed vertically in a remote position. It may be preferred, however, that the screen shall remain in the cabinet cover in order to receive thereon images cast by a projector B (Fig. 3) which contains a lamp (not shown) supplied with electric current from the lead 17. The projector is supplied with dual mountings at the front and rear ends consisting of depending parallel brackets 26, either of which is adapted to slide into a suitable socket 27 on the outside of the cabinet for purposes later to be explained. Within the cabinet, and preferably opposite the socket 27, is a holder 28 which is adapted to engage inwardly turned ends 26ᵃ on the brackets 26, as shown in Fig. 5, so as to provide a means for mounting the projector within the cabinet parallel to the turntable and adjacent thereto. The projector is made flat and thin for this purpose.

In Fig. 3 the parts are so arranged that when the cabinet body is placed on a horizontal surface, such as a table, and the cover is opened to a position wherein the screen 22 is substantially vertical, the wide bottom portion 14ᵃ of the cover serves as a substantial base to support the cover when thus opened, and at the same time removes the screen from the projector an amount substantially equal to the width of the base 14ᵃ. At the same time the projector is preferably spaced still further from the screen by the bracket arrangement shown. Focusing of the picture upon the screen is accomplished by the usual focusing attachment forming part of the projector. This projector may be of the film slide type, as shown, the apparatus for advancing the film through the projector being hereinafter described.

Thus it will be seen that the apparatus just described provides a self-contained projector unit which can be quickly set up and operated in a minimum of time and space. The apparatus also includes a self-contained sound projection apparatus which can be operated from the same source of electric energy that is used for the projection of images. Thus the disk record D may have recorded thereon a description in words of various pictures that it is planned to throw upon the screen. In such case the film slide will be advanced from time to time by the operator in order to synchronize the sound and pictures.

In certain cases it may be advisable to locate the screen at a further distance. One way of doing this is to remove as a unit the cover, together with the screen and loud speaker, from the cabinet body. This can be done in various ways, such as making the hinge pin 15 removable and providing a suitable flexible connection between the amplifier and the loud speaker that is contained in the cover. The cover may then be removed to a location which is remote from the cabinet body, as illustrated in Fig. 4, to receive a picture cast by the projector.

If desired, the projector can be reversed, as shown in Fig. 2, in which case the picture will be projected in the reverse direction upon the screen 22 or any other screen which is placed at a remote point. At the same time the loud speaker may be contained in a suitable unit 21ᵃ which normally lies within the base of the cover, but which may be removed therefrom as shown in Fig. 2, in order to place the loud speaker near the screen when the latter is removed from the cover. A flexible cord 19 is provided to connect the loud speaker with the amplifier.

Figures 8 to 11 inclusive illustrate the apparatus for advancing the film through the film slide projector. The projector has side walls 30 having suitable bearings in which is journaled a shaft 31 having a ratchet 32 firmly secured thereon. Sprocket wheels 33 are secured on the shaft midway between the side walls, and the sprockets are spaced from a sidewall by means of a spacer sleeve 34. An oscillating drum 35 is journaled in the shaft 31 and has a hub 35ᵃ and is normally held in retracted position by means of a spring 36 (Fig. 11) one end of which is secured to the hub 35ᵃ, while the other end hooks over a finger 37 of a framing lever 38. The framing lever is journaled on an extension 39 of a stationary plate 40, in front of which the lever moves. This plate is provided with a series of notches for holding the lever 38 in any adjusted position.

The ratchet 32 is provided with a series of ratchet teeth, preferably four in number as shown in Fig. 10, and these are adapted to be engaged one at a time by means of a pawl 41 which is mounted on a pin 42 in the side of the drum. A flexible cord 43 passes around the outer arcuate surface of the pawl 41 and is secured thereto, so that a pull on the cord will cause the pawl to be urged toward the teeth of the ratchet. When so engaged the ratchet moves in a clockwise direction (Fig. 10) until stopped by the finger 37 in the slot 35ᵇ. On discontinuing pull on the cord the spring 36 returns the drum 35 to its normal position, shown in Fig. 9, in which the pawl rides up over the top of the finger 37 and is held out of engagement with the ratchet. When the operator wishes to project the next picture on the screen he pulls on the cord 43 which causes the pawl to engage the next tooth of the ratchet and to carry it around substantially 90°, thereby advancing the film (not shown) an amount equal to the width of one picture. If the picture is not properly framed, the framing lever 38 is moved until the picture assumes the proper position on the screen. The point at which the picture stops is fixed by the position of the finger 37 which acts as a stop for the drum 35.

I claim:

1. A portable projector apparatus comprising a cabinet having a cover, a screen on the inside of the cover, a projector, a mounting for the projector such that the projector may be supported on the cabinet at a point remote from the screen to project an image upon the screen within the cover when the cover is open, means for carrying the projector within the cabinet when the cover is closed thereon, a sound record, means within the cabinet for playing the sound record including an electrical sound reproducer, means for amplifying the electric current produced thereby, and a loud speaker mounted in the base of the cover, the cover with the screen and speaker being removable from the cabinet to a more distant location for projection of an image thereon.

2. A portable projector apparatus comprising a cabinet having a cover, a screen removably carried on the inside of the cover, a projector adapted to be mounted in one position on the side of the cabinet remote from the screen to project a picture upon the screen when the cover is open and in another position to be packed within the cabinet, a sound record, means within the cabinet for playing the sound record including an electrical sound reproducer, means for amplifying the electric current produced thereby and a loud speaker mounted within the cabinet adjacent the screen, the speaker and screen being removable from the cover to a point outside the cabinet.

JOSEPH ERWOOD.